Patented Jan. 16, 1940

2,187,130

UNITED STATES PATENT OFFICE 2,187,130

TREATED PIGMENT AND PROCESS FOR PRODUCING THE SAME

Albert Lightbody, Elizabeth, N. J., assignor to E. I. du Pont de Nemours & Company, Wilmington, Del., a corporation of Delaware No Drawing. Application April 24, 1937, Serial No. 138,743

6 Claims. (Cl. 134—78)

This invention relates to a method for producing a discoloration-resistant pigment, whereby when subsequently incorporated in coating compositions, the latter become likewise stain-resistant.

More particularly, the invention provides a direct, simple and inexpensive method for overcoming the discoloring or staining characteristics which pigments and coating compositions exhibit when in close proximity or association with metals or metal compounds. In a more specific sense, the invention provides a reagent which is suitable for treating pigments or pigment compositions, which reagent is adapted to react with a metal or metal compound, whereby colorless, white or more or less neutral-colored products are formed and staining or discoloration prevented.

Pigments and pigment compositions when associated or contacted with certain metals or metallic compounds such as copper or copper compounds, discolor badly, especially in the presence of moisture. In instances of a white or light-colored coating or paint film, this characteristic is particularly objectionable, and is very noticeable when the coating films are associated with copper screens. This staining or discoloration is denominated "screen staining" in the paint art. Additionally, while so-called screen staining is most common, other instances of pigment and pigment composition discoloration exist. For example, in paper making, wherein acid systems prevail, pigments are employed to impart opacity and color improvement to the finished product. The mill installation contains copper or brass equipment and when pigments, particularly sulfide-containing pigments, or paper stock in which they may be present, come in contact with such equipment, discoloration by formation of dark copper sulfide ensues, and the very purpose for which the pigment is employed is thus defeated and serious degration of the color or brightness of the finished paper results.

It has been found that if a pigment or pigment composition is subjected to treatment with a relatively small and minor quantity of a compound adapted to react with a metal or metal compound to form colorless, white, or more or less neutral-colored products, or complex ions from which the metal ion will not precipitate in the presence of sulfide ions, the resultant pigment or composition will exhibit desired and satisfactory stain resistance.

Accordingly, it is among the objects of the invention to overcome the objectionable staining and discoloration characteristics of prior pigments and coating compositions, and to provide a pigment and pigment composition which will be particularly resistant to so-called "screen staining." A further object includes the production of a pigment for coating composition use, possessing no tendency towards discoloration, even in the presence of moisture.

An additional object is to provide an expeditious and simple method for determining the stain-resistant characteristics of pigments or pigment compositions.

Other and further objects will be apparent from the following description:

Broadly, the invention contemplates treating pigments or pigment compositions with a relatively minor amount of a thiocyanate, thiosulfate, or xanthate, or mixtures of the same, whereby said pigments or compositions are rendered satisfactorily stain-resistant.

In a more specific and preferred embodiment, the invention contemplates treating zinc sulfide pigments or compositions in which the same are contained with a small amount of a relatively insoluble thiocyanate or thiosulfate, particularly barium thiocyanate or thiosulfate.

In adapting the invention to practice, the novel agent utilized, or mixtures of such treating agents, may be incorporated in or added to the pigment or coating composition in any desired manner. Preferably, addition is effected in the dry state and to the finished, dry pigment, i. e., one in which the desired pigmentary properties such as tinting strength, hiding power, color, etc., have been already developed, such addition being had as the pigment enters the final dry grinding or pulverizing phases of its processing. In this manner the treating agent becomes uniformly dispersed in a fine state of subdivision throughout the pigment, and the possibility of agent decomposition during calcination is thus prevented. However, in processes in which the zinc sulfide has its pigmentary properties largely developed on precipitation, the agent or agents may be incorporated in the pigment at any time. Similarly, while the resistance agent may be added as indicated, it may be directly incorporated in a paint composition during paint grinding, or even after grinding has been concluded. Similarly, in pigmentation of paper the agent may be added at some convenient step in the paper-making process, instead of to the pigment or pigment composition.

In order that the invention may be more clearly understood, the following examples are given, all of which are merely illustrative in character:

Example I

To an aqueous slurry of calcined zinc sulfide pigment was added sufficient sodium thiosulfate to form 3% of barium thiosulfate, based on the weight of the pigment (dry basis). After thorough mixing and while continuing agitation, a chemically equivalent amount of barium chloride was added. The treated pigment was then filtered, washed, dried and disintegrated.

The treated pigment recovered exhibited on test marked resistance to copper staining, and when incorporated into conventional exterior paint compositions, such compositions showed like exceptional resistance to discoloration by screen staining. Additionally, the treated pigment was found to be highly resistant to copper staining under conditions comparable to those encountered in pigmentation of paper.

Example II

One part by weight of barium thiosulfate in the form of a water suspension was added to a water slurry of lithopone containing 100 parts by weight of pigment (dry basis) during subjection of the latter to efficient agitation. The treated pigment resulting was separated from the water and incorporated into a conventional oil paint. The product on test was found resistant to discoloration and copper staining, whereas a similar but untreated pigment on test exhibited pronounced staining and discoloring tendencies.

Example III

Two parts by weight of dry sodium thiocyanate were thoroughly incorporated into 98 parts by weight of a dry zinc sulfide pigment by addition at a predetermined uniform rate to the zinc sulfide pigment while the latter was being fed into a disintegrator. The treated pigment on test was found resistant to copper staining, whereas a similar but untreated pigment discolored badly within a minute's time when subjected to a like test.

In lieu of the sodium thiocyanate employed in the preceding example, potassium or sodium xanthate may also be utilized with equal effect.

In instances where an insoluble form of agent is employed, it will be found preferable to precipitate the agent onto the pigment, as shown in Example I. On the other hand, when a relatively soluble form of agent is used, as in the instance of Example III, dry blending of the agent with the pigment will be found an effective and preferable method of incorporation.

The tests referred to in the examples for determining the stain-resistance characteristics of the pigments and coating compositions in question comprised adding a drop of 1% copper sulfate solution to a test sample of the dry pigment. If non-resistant to staining, discoloration of the pigment or coating composition occurred within substantially one minute of time. If, on the other hand, the pigment or coating composition was stain resistant, the addition of the 1% copper sulfate solution induced no staining or discoloration within or after the specified time.

While specific amounts of treating agents and particular methods for incorporating the same in the pigments have been set forth in the examples, obviously any desired proportion or method of incorporation may be resorted to without departure from the underlying principles of the invention. In general, the amount of treating agent employed will be found subject to wide variance and will depend upon the character of the pigment or coating composition itself, as well as upon the degree of stain-resistance desired to be imparted. Usually an amount of agent ranging from substantially .2% to 5%, based on the weight of the pigment, will be found most satisfactory for obtaining optimum beneficial effects and such range will be, accordingly, found preferable. While this range is specified, it is merely preferential and amounts of agent ranging as low as .10% to as high as 10%, based on the weight of the pigment, may be employed, if desired.

As indicated above, the invention is broadly directed to the use of metallic thio salts in pigment and coating compositions, the term "metallic thio salts", here and in the appended claims, including any of the soluble, slightly soluble, or insoluble metal salts of thiocyanic acid containing the monovalent radical $-SCN$, the metal salts of thiosulfuric acid ($H_2S_2O_3$) or other sulfur-containing compounds forming colorless compounds such as salts of xanthogenic acid ($CS(OC_2H_5)SH$). While, as indicated, all types of thiocyanates, thiosulfates, and xanthates may be employed in the invention, in some instances the use of soluble forms of these agents or mixtures of the same will be found suitable, particularly in interior applications, whereas in other instances such as where the pigments and coating compositions are to be employed in exterior applications and subject to weathering influences, the employment of less soluble or insoluble forms, or mixtures of the same, will be found preferable. Accordingly, choice of agent, insofar as its solubility characteristics are concerned, will be governed by the purposes of applications to which the pigment or composition is to be put. Generally, however, the employment of insoluble or slightly soluble forms of these compounds will be found preferable since they lend themselves to wider and more extensive adaptations. Examples of such types include barium, thallium, and lead thiocyanates and thiosulfates. Other types include the mercuric and mercurous thiosulfates and thiocyanates, as well as those of silver. The latter, though utilizable, are not particularly adaptable for use in the invention, and their use is therefore not preferred. Other specific types of thiosulfates, thiocyanates, and xanthates, include those of sodium, potassium, and calcium. Obviously, these may be individually employed or as mixtures.

As indicated above, the invention has particular applicability to the treatment of zinc sulfide pigments, treatment being effected by blending the agent in the dry state with the pigment or by adding the agent to an aqueous slurry or suspension of the pigment, etc. Treatment of all types of zinc pigments is contemplated in the invention, and accordingly the term "zinc containing pigments", here and in the appended claims, includes not only commercially pure zinc sulfide, but high and normal zinc sulfide lithopones, i. e., both the barium and calcium base forms. The term also includes any other pigmenting compositions containing zinc sulfide, such as titanated lithopones or mixtures of lithopones with natural extenders, such as silicates, mica, barytes, clay, calcium carbonate, calcium sulfate, silica, etc.

I claim as my invention:

1. A process for rendering zinc sulphide-containing pigments stain resistant, comprising incorporating in said pigment a minor quantity of a relatively insoluble metallic thio salt from the group consisting of a thio cyanate, thio sulphate and xanthate.

2. A process for rendering zinc sulphide-containing pigments stain resistant, which comprises incorporating on the surface of said pigment a minor quantity of barium thio sulfate.

3. A process for rendering zinc sulphide-containing pigments stain resistant, which comprises incorporating on the surface of said pigment a minor quantity of barium thiocyanate.

4. A stain resistant pigment composition comprising calcined zinc sulfide and from about .1% to 10%, based on the weight of the pigment, of a relatively insoluble metallic thio salt from the group consisting of a thiocyanate, thiosulfate and xanthate.

5. A pigment composition comprising calcined zinc sulfide and a minor quantity of a thiosulfate.

6. A pigment composition comprising calcined zinc sulfide and a minor quantity of a xanthate.

ALBERT LIGHTBODY.